United States Patent
Nguyen

(10) Patent No.: US 10,708,758 B2
(45) Date of Patent: Jul. 7, 2020

(54) ELECTRONIC DEVICE FOR DISPLAYING AND UPDATING MOBILE NETWORK OPERATION INFORMATION AND CONTROLLING METHOD THEREOF

(71) Applicant: Samsung Electronics Co., Ltd, Gyeonggi-do (KR)

(72) Inventor: Hong Viet Nguyen, Ha Noi (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 16/044,170

(22) Filed: Jul. 24, 2018

(65) Prior Publication Data

US 2019/0149978 A1  May 16, 2019

(30) Foreign Application Priority Data

Nov. 10, 2017  (KR) .................. 10-2017-0149872

(51) Int. Cl.
*H04W 8/18* (2009.01)
*H04W 4/24* (2018.01)
(Continued)

(52) U.S. Cl.
CPC ......... *H04W 8/183* (2013.01); *H04M 7/0063* (2013.01); *H04M 7/0081* (2013.01); *H04M 15/00* (2013.01); *H04M 15/06* (2013.01); *H04M 15/765* (2013.01); *H04M 15/8083* (2013.01); *H04M 15/83* (2013.01); *H04M 15/84* (2013.01); *H04M 15/844* (2013.01); *H04M 15/846* (2013.01); *H04M 15/85* (2013.01); *H04W 4/20* (2013.01); *H04W 4/24* (2013.01); *H04M 15/8088* (2013.01); *H04W 88/06* (2013.01)

(58) Field of Classification Search
None
See application file for complete search history.

(56) References Cited

U.S. PATENT DOCUMENTS 8,626,165 B1 * 1/2014 Narasimhan .......... H04W 36/14
                                                     455/435.2
2008/0133580 A1 * 6/2008 Wanless ............ H04L 29/12122
(Continued)

OTHER PUBLICATIONS https://apkpure.com/add-provider/com.addprovider.activity, dated Aug. 15, 2016, 3 pages.

*Primary Examiner* — Chi H Pham
*Assistant Examiner* — Vladislav Y Agureyev

(57) ABSTRACT

An electronic device which displays and updates Mobile Network Operator (MNO) information includes a memory, a display, a communicator, a user inputter, and a processor. The processor is configured to control the display to display a contact list including telephone number information of a plurality of external devices and Mobile Network Operator (MNO) information of the plurality of external devices, and in response to a user command for selecting one of the plurality of external devices included in the contact list being input, establish a communication connection with the selected external device. The processor is further configured to control the communicator to receive information regarding the MNO information of the external device from the selected external device; and update the contact list based on the MNO information of the external device and store the updated contact list in the memory.

17 Claims, 11 Drawing Sheets

(51) Int. Cl.
*H04M 7/00* (2006.01)
*H04W 4/20* (2018.01)
*H04M 15/00* (2006.01)
*H04M 15/06* (2006.01)
*H04W 88/06* (2009.01)

(56) References Cited

U.S. PATENT DOCUMENTS

| | | | |
|---|---|---|---|
| 2008/0176535 A1* | 7/2008 | Cai | H04M 15/00 455/414.1 |
| 2008/0182552 A1* | 7/2008 | Dinh | H04L 12/66 455/408 |
| 2010/0216439 A1* | 8/2010 | Marcelli | H04M 15/00 455/414.1 |
| 2012/0173367 A1* | 7/2012 | Soroca | G06Q 30/08 705/26.3 |
| 2013/0040618 A1* | 2/2013 | D'amato | H04M 1/72522 455/414.1 |
| 2013/0130643 A1* | 5/2013 | Bacareza | H04L 29/06537 455/406 |
| 2013/0322329 A1* | 12/2013 | Visuri | H04W 48/16 370/328 |
| 2014/0004827 A1* | 1/2014 | O'Leary | H04W 8/22 455/411 |
| 2014/0031012 A1* | 1/2014 | Park | H04W 12/06 455/411 |
| 2015/0119018 A1* | 4/2015 | Yang | H04W 48/16 455/419 |
| 2016/0020803 A1* | 1/2016 | Cha | H04W 76/10 455/558 |
| 2016/0330332 A1* | 11/2016 | Celik | H04M 3/42357 |
| 2017/0206529 A1* | 7/2017 | Raleigh | H04M 15/00 |
| 2017/0366634 A1* | 12/2017 | Bonnet | H04M 15/50 |
| 2018/0041954 A1* | 2/2018 | Tamura | H04M 11/00 |
| 2018/0124252 A1* | 5/2018 | Singh | H04M 15/39 |
| 2018/0160290 A1* | 6/2018 | Bouvet | H04L 45/745 |
| 2019/0075448 A1* | 3/2019 | Prakash | H04W 8/205 |
| 2019/0104405 A1* | 4/2019 | Turcanu | H04W 8/183 |

* cited by examiner

ELECTRONIC DEVICE FOR DISPLAYING AND UPDATING MOBILE NETWORK OPERATION INFORMATION AND CONTROLLING METHOD THEREOF

CROSS-REFERENCE TO RELATED APPLICATIONS AND CLAIM OF PRIORITY

This application is based on and claims priority under 35 U.S.C. § 119 to Korean Patent Application No. 10-2017-0149872 filed on Nov. 10, 2017, in the Korean Intellectual Property Office, the disclosure of which is incorporated herein by reference in its entirety.

TECHNICAL FIELD

Aspects of the embodiments relate to an electronic device which displays and updates Mobile Network Operator (MNO) information related to telephone numbers in a contact list of an electronic device such as a smartphone, and a controlling method thereof.

BACKGROUND

A MNO provides a wireless voice service and a data communication service (e.g., a call and a message) to a mobile user who is subscribed to the MNO. In order to attract a new subscriber in a competition with other MNOs, an MNO offers a special rate promotion or provides a free phone call and a free message performed between the users subscribed to the same or related MNO. However, it is difficult for a user to determine whether the telephone number in his/her contact list is a telephone number with which a call and a message can be performed with a discounted rate, sometimes there is a restriction in using the discounted rate effectively.

SUMMARY

Embodiments of the present disclosure has been made to solve the above problems, and in accordance with an aspect of the present disclosure, an electronic device which updates and displays the MNO information of counterparts' telephone numbers stored in the contact list of the user's electronic device, and a controlling method thereof are provided.

According to an embodiment, there is provided an electronic device including a memory, a display, a communicator, a user inputter, and a processor, and the processor configured to control the display to display a contact list which includes telephone number information of a plurality of external devices and Mobile Network Operator (MNO) information of the plurality of external devices, in response to a user command for selecting one of the plurality of external devices included in the contact list being input, establish a communication connection with the selected external device, in response to the communication connection being established, control the communicator to receive information regarding the MNO information of the external device from the selected external device, and in response to the received MNO information of the external device being different from MNO information of a pre-stored external device, update the contact list based on the MNO information of the external device and store the updated contact list in the memory.

The communicator may transmit notification information that MNO information of the electronic device is changed, to an external server, and receive notification information that MNO information of at least one external device among the plurality of external devices is changed, from the external server, and the processor, in response to notification information that MNO information of at least one external device among the plurality of external devices is changed being received from the external server, may receive changed MNO information of the external device from the external server, update the contact list based on the changed MNO information, and stores the updated contact list in the memory.

The display may display call rate information related to the MNO information.

The processor, in response to a user command for selecting one of a plurality of external devices included in the contact list being input through the user inputter, may automatically select telephone number information including an MNO that charges low call rate from among a plurality of telephone number information of the selected external device, and establish a communication connection with the selected external device by using the automatically selected telephone number information.

The processor may receive special information that a special promotion regarding call rates is offered by a MNO related to telephone number information of the contact list, through the communicator, and display the special promotion information on a display.

The processor may control to display the contact list when a predetermined user input being received through the user inputter.

According to an embodiment, there is provided a method for controlling an electronic device including displaying a contact list which includes telephone number information of a plurality of external devices and Mobile Network Operator (MNO) information of the plurality of external devices, in response to a user command for selecting one of the plurality of external devices included in the contact list being input, establishing a communication connection with the selected external device, in response to the communication connection being established, receiving information regarding the MNO information of the external device from the selected external device, and in response to the received MNO information of the external device being different from MNO information of a pre-stored external device, updating the contact list based on the MNO information of the external device and store the updated contact list in the memory.

The receiving may include receiving notification information that MNO information of at least one external device among the plurality of external devices is changed, from an external server, and the updating and storing comprises, in response to notification information that MNO information of at least one external device among the plurality of external devices is changed being received from the external server, receiving changed MNO information of the external device from the external server, updating the contact list based on the changed MNO information, and storing the updated contact list in the memory.

The displaying may include displaying call rate information related to the MNO information.

The establishing a communication connection may include, in response to a user command for selecting one of a plurality of external devices included in the contact list being input, automatically selecting telephone number information including an MNO that charges low call rate from among a plurality of telephone number information of the selected external device, and establishing a communication connection with the selected external device by using the automatically selected telephone number information.

The displaying may include receiving information that a special promotion regarding call rates is offered by a MNO related to telephone number information of the contact list is operated, and displaying the special promotion information on a display.

The displaying may include displaying the contact list only when a predetermined user input being received.

According to an embodiment of the present disclosure, a user may easily grasp the MNO information of a telephone number through a contact list, and automatically update the MNO information of the telephone number through the contact list. In addition, according to an embodiment, a user may use a phone call and message with lower cost.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
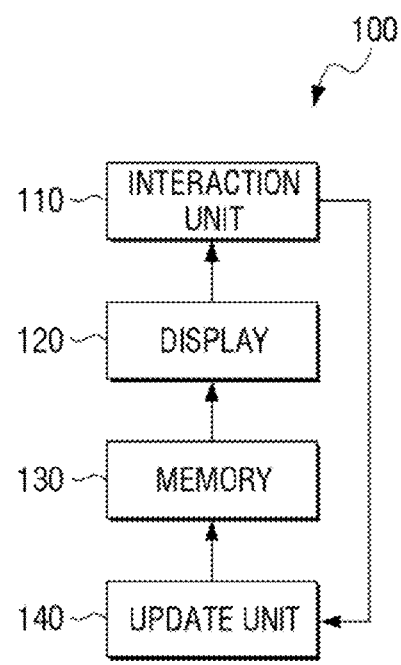
FIG. 1 is a view illustrating a functional feature to display, interact, and update MNO information related to telephone numbers in a contact list stored in a memory of an electronic device according to an embodiment.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Embodiments of the present disclosure are described in detail with reference to the accompanying drawings. However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

In the description, the term "has", "may have", "includes" or "may include" indicates existence of a corresponding feature (e.g., a numerical value, a function, an operation, or a constituent element such as a component), but does not exclude existence of an additional feature.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element). Meanwhile, when it is mentioned that one element (e.g., first element) is "directly coupled" with or "directly connected to" another element (e.g., second element), it may be understood that there is no element (e.g., third element) present between one element and another element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, the phrase "processor configured to perform A, B, and C" may denote or refer to a dedicated processor (e.g., embedded processor) for performing the corresponding operations or a generic-purpose processor (e.g., CPU or application processor) that can perform the corresponding operations through execution of one or more software programs stored in a memory device.

Below, embodiments will be described in detail with reference to the attached drawings.

Hereinafter certain embodiments will now be described in greater detail with reference to the accompanying drawings to enable those skilled in the art to work the same with ease. However, embodiments may be realized in a variety of different configurations, and not limited to descriptions provided herein. Further, those that are irrelevant with the description are omitted so as to describe exemplary embodiments more clearly, and similar drawing reference numerals are used for the similar elements throughout the description.

First, referring to FIG. 1, the configuration of the electronic device 100 is shown in a form of a smartphone or another mobile communication device as an example. For ease of describing the operation of various embodiments, an electronic device in the embodiments will be described as a smartphone. The electronic device 100 stores, displays, interact, and update the MNO information related to telephone numbers in a contact list included in a user smartphone 10. The electronic device 100 in an embodiment includes a memory 130, an update unit 140, a display 120, and an interaction unit 110 which perform various functions and which will be described in detail below.

For ease of describing an operation of an embodiment, only an embodiment in which the MNO information related to a telephone number in a user's contact list of the smartphone 10 is changed and the user's contact list is updated would be described herein. However, it should be understood that if a similar operation is performed in the smartphone 20 of the counterpart and the MNO related to the user's telephone number is changed, the contact list of the counterpart's smartphone 20 is updated similarly. For ease of describing the operation in an embodiment, the embodiment merely describes that MNO information related to a telephone number of a single person is changed. However, it should be understood that the similar process may be performed with a plurality of persons in a contact list of the user's smartphone 10.

The memory 130 includes a flash memory for storing a contact list which includes contact information related to each of a plurality of contacts. The contact information of each of the plurality of contacts includes telephone numbers related to each of the contact, an MNO related to each of the telephone number of each contacts, and the information which notifies the rate when calling or sending message to each telephone number. In addition, the memory 130 may be in an external server 600 connected to a user's smartphone 10 such as a cloud-based hardware/software platform. In this case, the contact list information in the memory 130 in the external server 600 may be accessed remotely by the user's smartphone 10, and interlocked with the contact list information of the memory 130 in the user's smartphone 10.

The display 120 may include a user-interactive touch-sensitive display screen of the user's smartphone 10. The user-interactive touch-sensitive display screen serves as a user inputter which displays contact information included in a contact list on an external display screen, receives user input information so as to display contact list information, and controls a general function of the user's smartphone 10. A software application may be downloaded in a flash memory of the user's smartphone 10 through an online file server via an internet connection. In addition, the software application may be executed through the processor of the user's smartphone 10, and thus the user-interactive graphical user-interface may be manipulated through a touch-sensitive display screen. The touch-sensitive display screen may receive a command input manually through a finger or a stylus. In another embodiment, the user inputter may include a keypad, a touchpad, a mouse, or a voice user inputter, and a user may use the user inputter manually for inputting a command in the user smartphone 10. The display 120 may include a display control processor which controls a display screen according to a user input.

The display screen may display contact list information according to one or more than one different layout and a format configuration. Through this, a user may rapidly and easily identify the MNO information and MNO call rate information related to the counterpart's telephone number in the contact list. In addition, according to an embodiment, the MNO information and call rate information related to the counterpart's telephone number may be displayed next to a name and a telephone number of the counterpart in a form of graphic, icon or text. As the user scrolls or search the contact list, the information related to each of the counterpart is displayed on a display screen and thus the user may easily identify the information of each counterpart, and the user may directly interact with the displayed information of the counterpart so as to control the user's smartphone 10. In this method, the user may easily receive the MNO information of a counterpart's telephone number used for determining whether a phone call is connected or a message is transmitted to the telephone number in a contact with a reasonable rate. According to an embodiment, the display control processor may highlight one or more information of a counterpart displayed on a display screen so as to easily identify whether a user connects a phone call or transmits a message to a counterpart with a low rate. For example, the highlight may be the effect that information of a counterpart is popped-up or flickered on a display screen. In addition, the highlight may be the effect that a graphic, a logo, or a text is displayed in a color different from a background color, or the size thereof becomes bigger. In addition, the highlight may be the effect that contacts, excluding the contacts which do not meet a specific criterion by a filtering of a software, are displayed.

Sometimes, a certain MNO provides special promotion rates so as to call or send a message to the telephone number subscribed to the same or related MNO for a predetermined period. The special promotion may be updated periodically to a user through a mail or a message service from an MNO. With regard to the special promotion, the display controller may provide a notification in real time that the user may call or send a message to a counterpart with a relatively low rate, during the promotion period.

The interaction unit 110 may receive a user input command through the user inputter, and establish a communication connection between the user's smartphone 10 and the counterpart's smartphone 20 according to the received input command. In this embodiment, the user-interactive touch-sensitive display screen of the display 120 may serve as a user inputter of the interaction unit 110. For example, the contact list information displayed on a display screen may be displayed in a form of text, icon, or graphic, and it may be activated by a user interaction of calling or sending a message to the mobile telephone number of a counterpart displayed in a form of text, icon, or graphic.

In addition, the interaction unit 110 may confirm if MNO information has been changed, and if the MNO information is changed, the interaction unit 110 may transmit the information that the MNO information has been changed to an update unit 140. According to an embodiment, the interaction unit 110 may transmit the information indicating the change to the same mobile communication device or another mobile communication device.

The update unit 140 may consist of a communicator which receives information that MNO information related to a telephone number has been changed, from the interaction unit 110, and a controller which updates contact information in the contact list based on the received information.

The information that the MNO information related to the telephone number in the contact list is changed may be received in various ways and updated. According to an embodiment, the update unit 140 may be included in the user's smartphone 10. In addition, after the MNO information is changed, if a communication connection between the user's smartphone 10 and the counterpart's smartphone 20 is established for the first time, the update unit 140 may receive information from the counterpart's smartphone 20 through a mobile communication network in a peer to peer (P2P) method. The changed MNO information may be received/transmitted between the user's smartphone 10 and the counterpart's smartphone 20 through a hardware and a software corresponding to an appropriate communication protocol. For example, the changed MNO information may be encoded in a data packet during a call, and may be received/transmitted through another communication method such as a SMS, an e-mail and the like. If the changed MNO information is received from the counterpart's smartphone 20, the user's smartphone 10 may update the changed MNO information through the update unit 140, and store the updated information through the memory 130. If the changed MNO information is updated to the memory 130, the display control processor of the display 120 may control to display the updated MNO information on the display screen to correspond to the setting desired by the user. According to another embodiment, the changed MNO information may be received/transmitted through the P2P communication protocol such as a Bluetooth, a zigbee, and an infra-red signaling.

Figure 2:
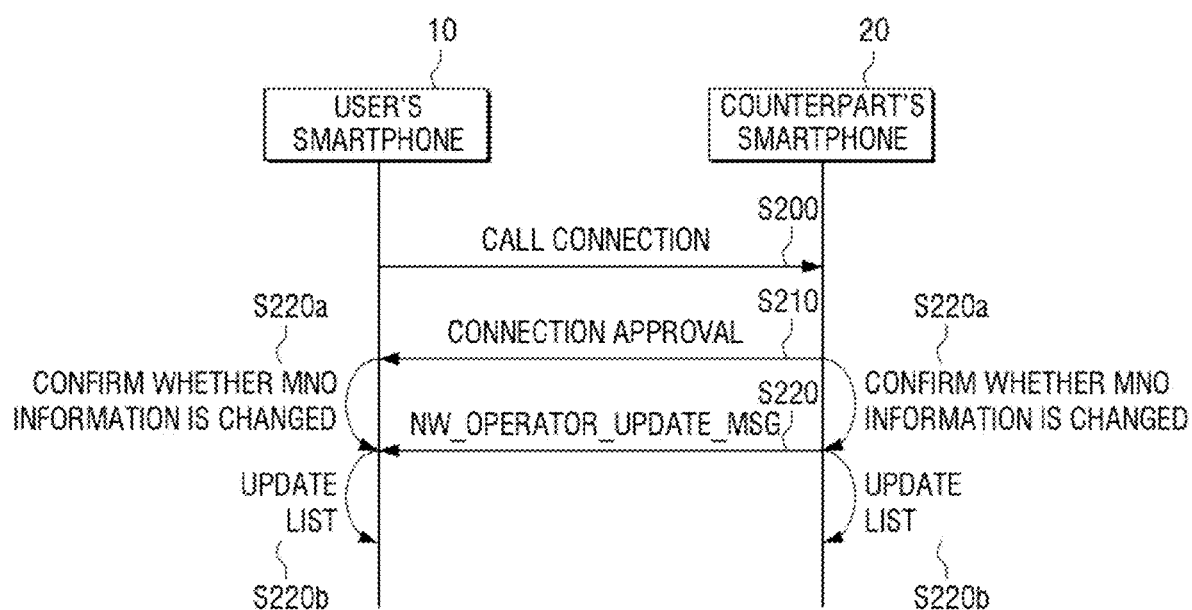
FIG. 2 is a diagram illustrating a process of updating MNO information related to a telephone number in the contact list in the user's smartphone memory while a communication connection is performed between a user's smartphone and a counterpart's smartphone according to an embodiment.

Referring to FIGS. 2 to 5, the P2P updating method is illustrated. Referring to FIG. 2, the user's smartphone 10 may connect a call to a counterpart's smartphone 20 in S200, and the call request may be permitted by the counterpart's smartphone 20 in S210. The interaction unit 110 of the counterpart's smartphone 20 may confirm if the MNO information of the counterpart's smartphone 10 has been changed in S220A. For example, the MNO information may be encoded in a SIM card of the counterpart's smartphone 20, and the interaction unit 110 of the counterpart's smartphone 20 may convert the MNO information to NW_OPERATOR_UPDATE_MSG message and transmit the message to the user's smartphone 10. The update unit 140 of the user's smartphone 10 may receive the MNO information, and update new MNO information related to the counterpart's telephone number to the contact list in the user's smartphone 10 in S220B. Referring to FIG. 2, if the MNO information of the user's smartphone 10 is changed, the changed MNO information may be transmitted to a counterpart's smartphone 20 interactively, and in this case, the update unit 140 of the counterpart's smartphone 20 may update the contact list in the counterpart's smartphone in S220.

Figure 3A:
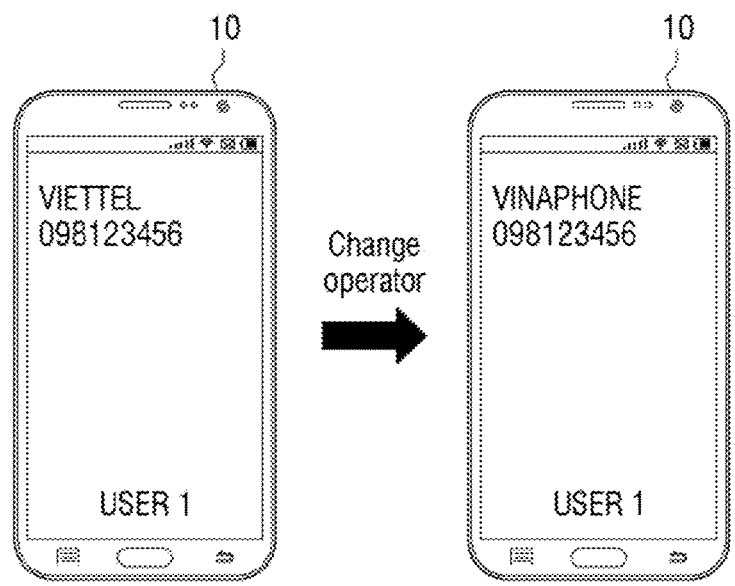
FIGS. 3A to 3C are views illustrating a detailed process of updating MNO information related to a telephone number in the contact list in a memory of a user's smartphone according to an embodiment.
Figure 3B:
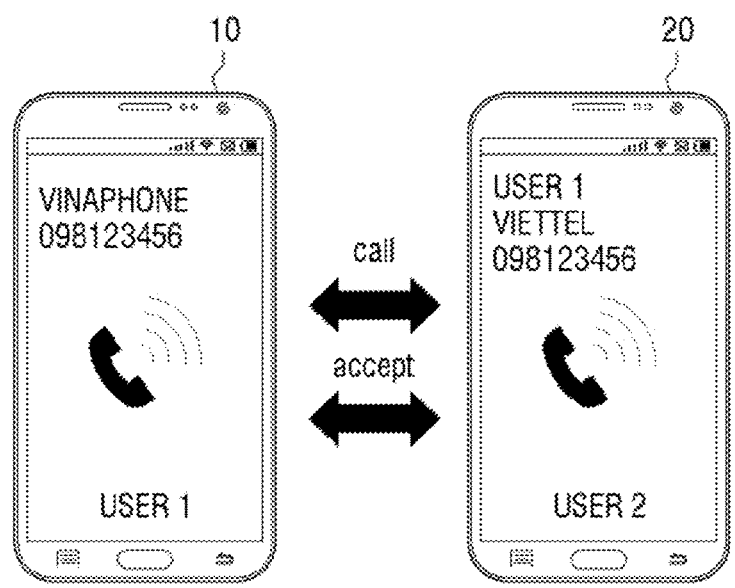
Figure 3C:
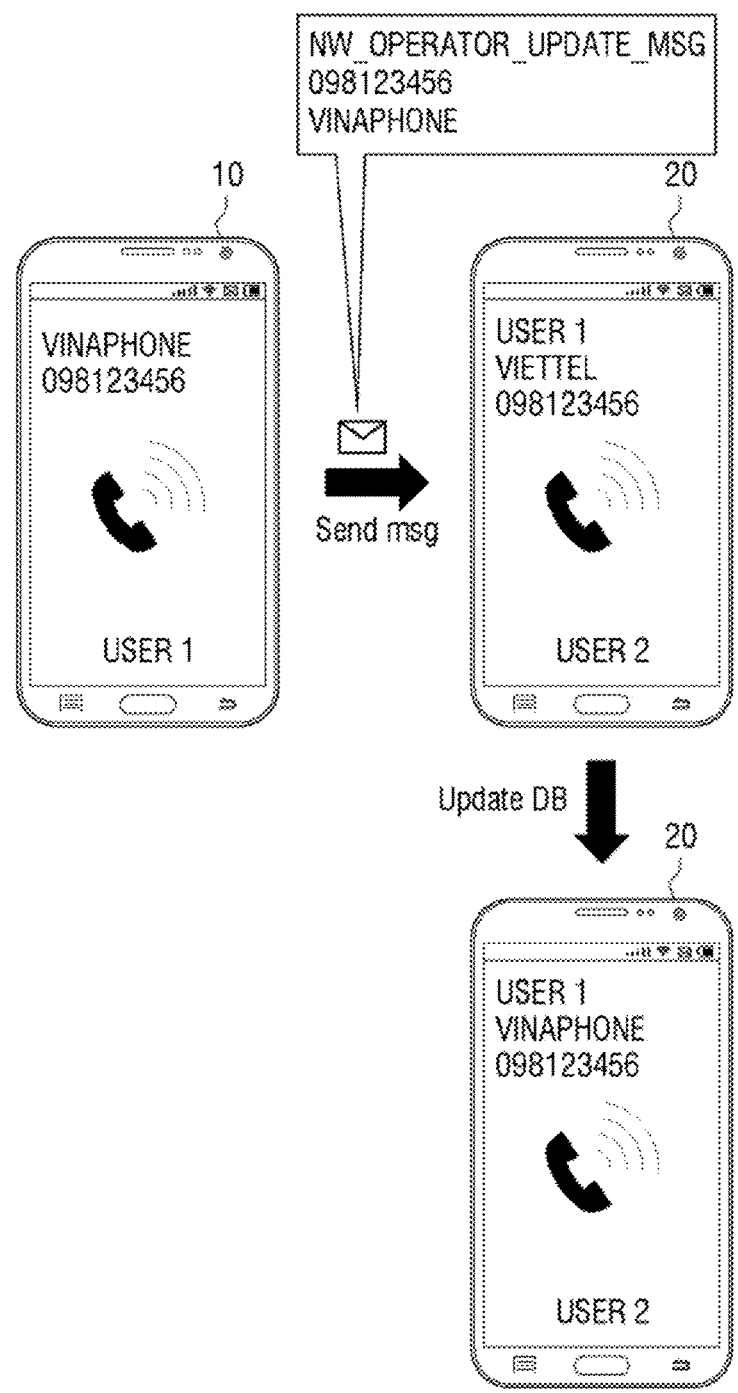

FIGS. 3A to 3C illustrate the above process in more great detail. Referring to FIG. 3A, the MNO information of the telephone number of the user's smartphone 10 may be changed from VITETTEL to VINAPHONE. FIG. 3B illustrates an interaction between the user's smartphone 10 and the counterpart's smartphone 20 for instance during call establishment. FIG. 3C illustrates that the converted information with regard to the changed MNO information of the user's smartphone 10 is transmitted from the user's smartphone 10 to the counterpart's smartphone 20. In addition, the counterpart's smartphone 20 may update the converted information to the contact list information of the counterpart's smartphone 20 through the update unit 140 of the counterpart's smartphone 20, and may store the converted information in the memory 130 of the counterpart's smartphone 20.

Figure 4:
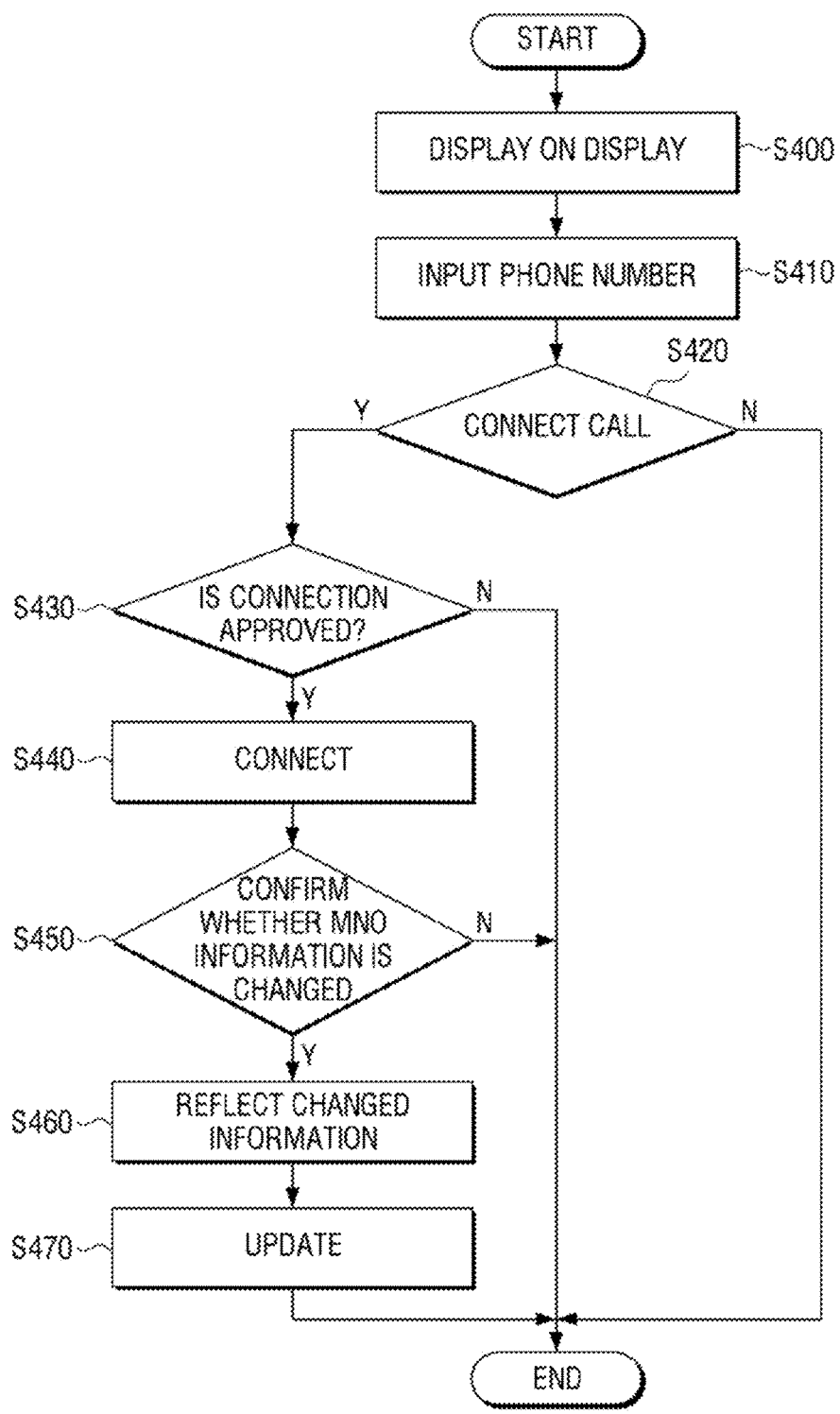
FIG. 4 is a flow chart illustrating a process of a user's smartphone communicating with a counterpart's smartphone, and a process of updating MNO information related to a telephone number of a contact information in a user's mobile smartphone according to an embodiment.

FIG. 4 is a flowchart which illustrates an exchange of the updated MNO information in detail. A user may input a telephone number of a counterpart and connect a call through a touch-sensitive display screen in S400, S410, and S420. The user's smartphone 10 may approve the call connection in S430, and the call between the user's smartphone 10 and the counterpart's smartphone 20 may be connected in S440. The update unit 140 of the user's smartphone 10 confirms whether there has been a change in the MNO information in S450. The user's smartphone 10 reflects the changed information in S460 and updates the MNO information related to the counterpart's telephone number in S470.

Figure 5:
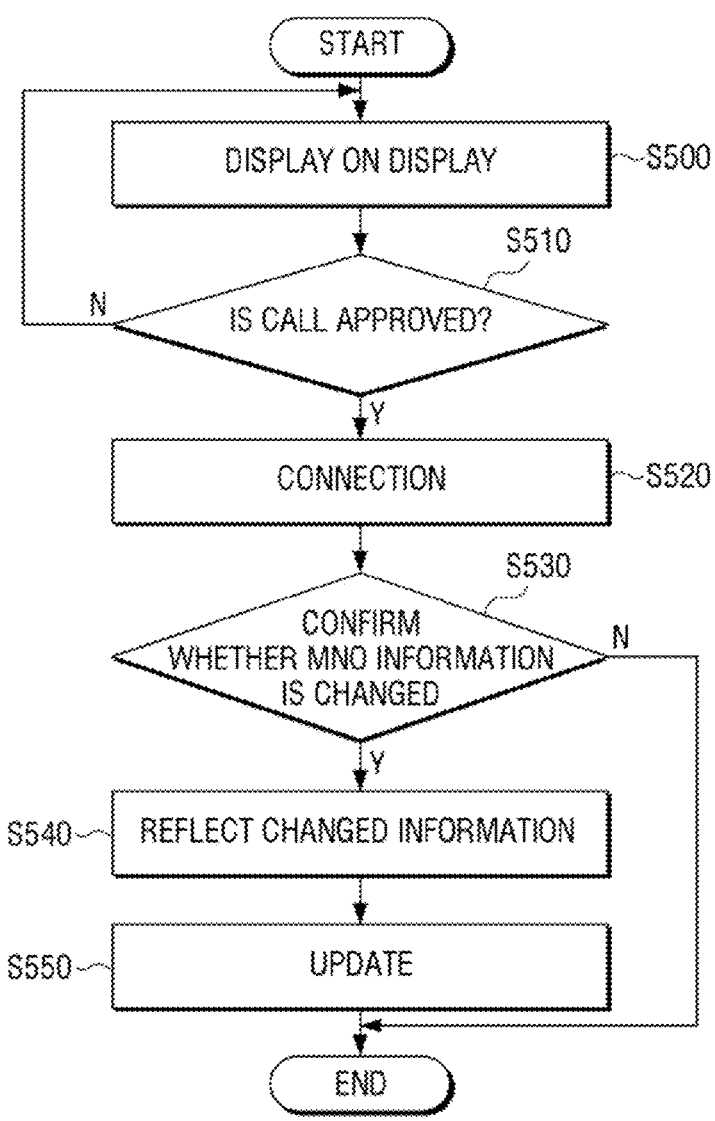
FIG. 5 is a flowchart illustrating a process of updating MNO information of contact information in a counterpart's smartphone when the user's smart phone calls the counterpart's smart phone according to an embodiment.
Figure 6:
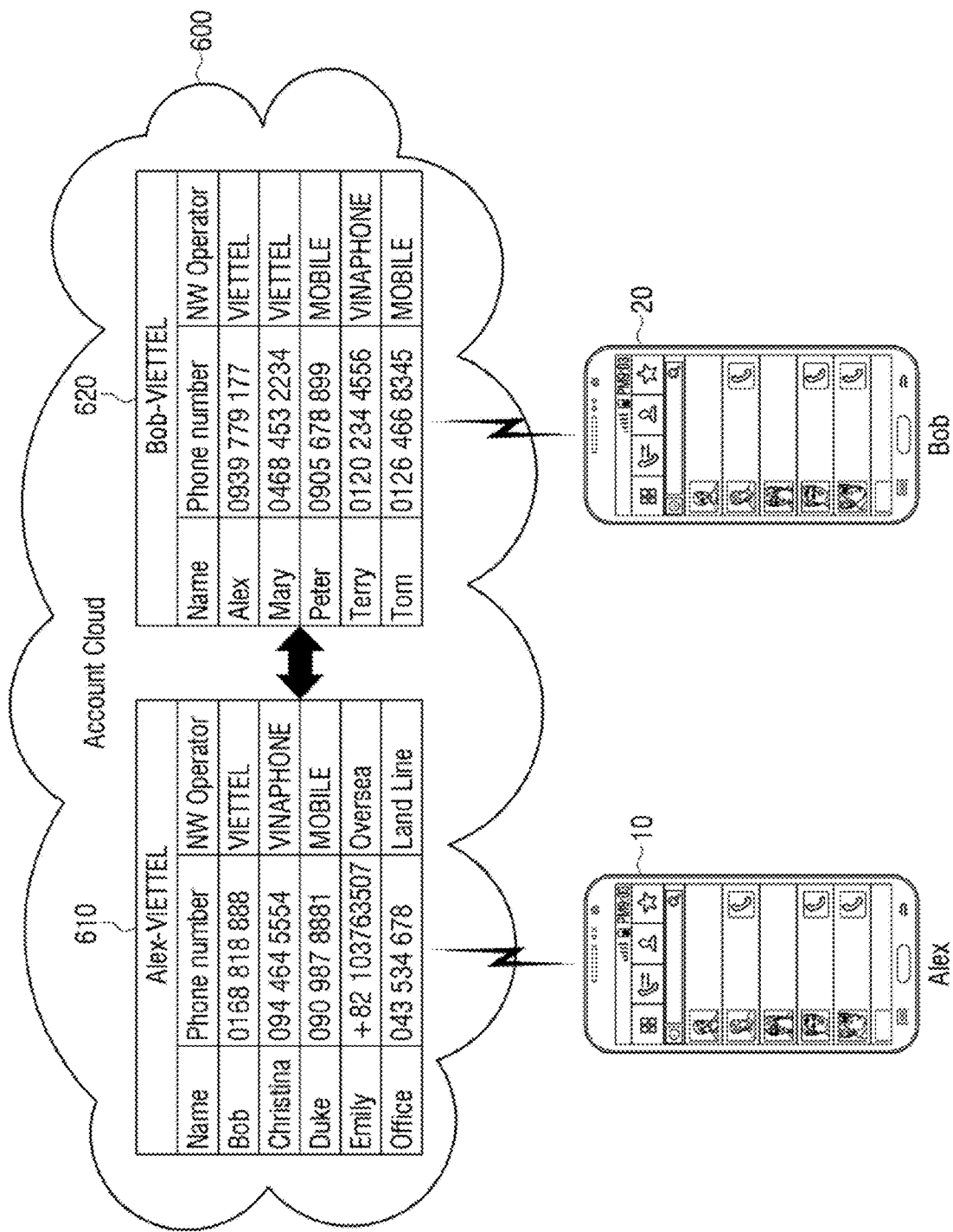
FIG. 6 is a view illustrating a cloud-based server platform for updating MNO information of the contact list stored in a user's smartphone memory according to an embodiment.

FIG. 5 illustrates the process of approving a call in S510 by pressing the approval button on the touch-sensitive display screen in S500, and accordingly, establishing the communication connection with the user's smartphone 10 in S520. The update unit 140 of the counterpart's smartphone 20 confirms whether there has been a change in the MNO information of the user's smartphone 10 in S530. The updated unit 140 of the counterpart's smartphone 20 reflects the changed information in S540, and updates the MNO information related to the user's telephone number in S550.

In addition, the update unit 140 may exist in an external cloud-based server 600 that is accessible by the user's smartphone 10 and the counterpart's smartphone 20 via an Internet connection. According to an embodiment, the update unit 140 may include an account managing unit operable on the external server 600 which is configured to set and register accounts 610 and 620 for each of the user (e.g. "Alex") and the counterpart (e.g. "Bob"). The accounts 610 and 620 may be set and registered as a display screen Graphic Use Interface (GUI) by a user or a counterpart through the software application executed in each of the smartphones 10 and 20, and may be set through a web page interface on a web browser of a desktop computer.

According to an embodiment, the contact list information of the user's smartphone 10 and counterpart's smartphone 20 may be stored by a controller of the memory 130 on the external server 600. In addition, the account managing unit may associate each account 610 and 620 of the user and the counterpart to each of the contact list information. Accordingly, if MNO information of the counterpart is changed, the following steps are performed.

1) Information that the MNO information is changed is transmitted from the counterpart's smartphone 20 to the external server 600 through an Internet. 2) The external server 600 confirms whether the counterpart's telephone number is stored in the stored contact list related to the user's account on the memory 130, and updates the changed MNO information of the counterpart to the user's contact list. 3) In addition, the external server 600 sends an update message to the update unit 140 in the user's smartphone 10 and synchronizes the user's contact list stored in the memory 130 of the external server 600 with the user's contact list stored in the memory 130 of the user's smartphone 10.

Figure 7:
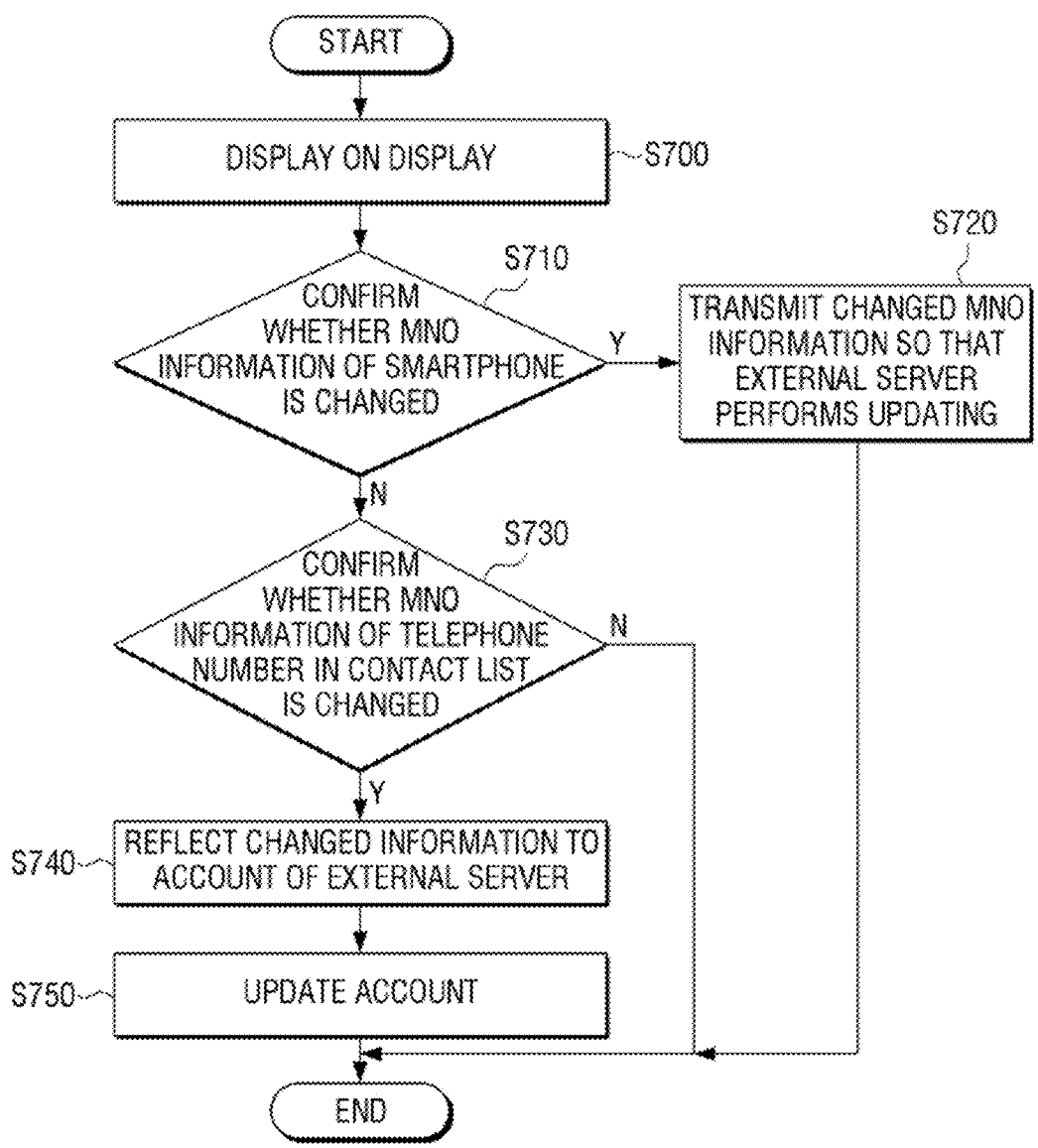
FIG. 7 is a flowchart illustrating an operation process of the cloud-based server platform illustrated in FIG. 6 according to an embodiment.

FIG. 7 illustrates a detailed updating process of a contact list information using a cloud-based server access. The user's smartphone 10 and the counterpart's smartphone 20 may be connected with the external server 600 via Internet in S700. The user's and the counterpart's interaction units 110 may periodically confirm whether there is a change on the MNO information related to the user's telephone numbers and the counterpart's telephone numbers in S710. In addition, the interaction unit 110 may transmit the information to the external server 600 so that the external server 600 associates the change of the MNO information of each telephone number with the accounts 610 and 620 of the user and the counterpart respectively, in S720. The update units of the user's smartphone 10 and the counterpart's smartphone 20 may confirm if there is a change on the MNO information related to the telephone number stored in each contact list, in S730, and if there is a change, the update units may transmit/receive the changed information to the external server 600 so as to reflect the change to update the user's and counterpart's contact lists related to each of the accounts 610 and 620 in S740 and update the contact lists in S750. If the contact list information related to each of the accounts 610 and 620 is updated, the server 600 may cross check other accounts stored in the server 600, confirm whether the shared contact information exists among the different accounts, and update the MNO information of the corresponding contact so as to be consistent among the various accounts.

Also in the case in which the MNO information of the user's telephone number is changed, the counterpart's contact list information is updated through a process similar to the above described process. In addition, the user's contact list and the counterpart's contact list may share a certain contact. According to an embodiment, the update unit which is operable by the user's smartphone 10 and counterpart's smartphone 20 may scan the contact list of each smartphone (for example, during a call establishment between the smartphones using the P2P method, or during a synchronization using the server-based approach), and may identify the part in which the MNO information of the sharing contact is inconsistent. The update unit 140 of each of the smartphones 10 and 20 may update the contact lists so as to reflect the most recent MNO information of the sharing contacts.

Figure 8:
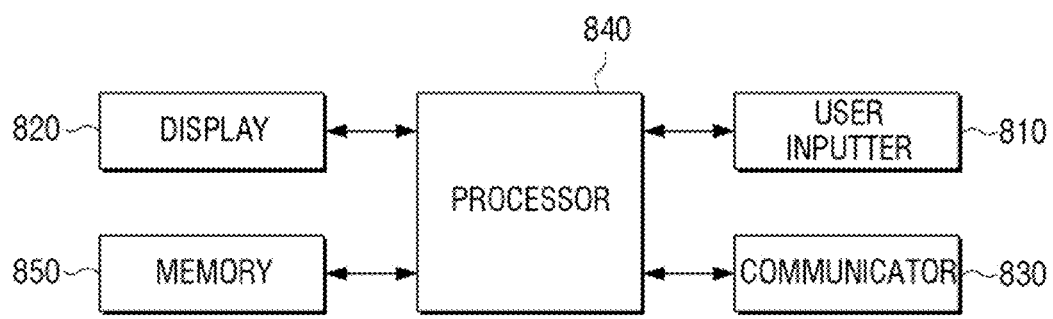
FIG. 8 is a view for illustrating a configuration of an electronic device according to an embodiment.

FIG. 8 is a view for illustrating a configuration of the electronic device 100 according to an embodiment. The interaction unit 110 may include a user inputter 810 and a communicator 830, but it is not limited thereto. The update unit 140 may include the communicator 830, but it is not limited thereto. The processor 840 may serve as an interaction unit 110 and an update unit 140, but it is not limited thereto. In addition, the display 820 may be realized as a display 120, and the memory 850 may be realized as a memory 130. The configuration of the electronic device is not limited to the above described embodiment.

According to FIG. 8, the electronic device 100 may include the user inputter 810, the display 820, the communicator 830, the processor 840, and the memory 850. Meanwhile, some configurations illustrated in FIG. 8 may be deleted, changed, or new configuration may be added according to the implementation of the electronic device 100. In addition, as illustrated in the above, the external device may include the counterpart's smartphone 20, but it is not limited thereto.

The display 820 may display a contact list which includes telephone number information of the plurality of external devices and MNO information of the plurality of external devices. The user inputter 810 may receive a user command for selecting one of the plurality of external devices included in the contact list displayed on the display 120. The communicator 830 may establish the communication connection between the user's smartphone 10 and the external device, and receive the information on the MNO information of the external device, from the external device.

The processor 840 controls the electronic device 100 generally. The processor 840 may be connected with the display 820, the memory 850, the user inputter 810, and the communicator 830, and control the electronic device 100, but it is not limited thereto. The processor 840 may display the contact list which includes the telephone number information of the plurality of external devices and MNO information of the plurality of external devices through the display 820. The processor 840 may receive the user command for selecting one in the contact list displayed on the display 820 from a user through the user inputter 810. In addition, the processor 840 may establish the communication connection between an external device and the electronic device 100 through the communicator 830, and when the communication connection is established, the processor 840 may receive the information on the MNO information of the external device through the communicator 830. If the received MNO information of the external device is different from the MNO information of the external device stored in the memory 850, the processor 840 may update the contact list based on the MNO information of the received external device, and store the received MNO information in the memory 850.

Meanwhile, the size of the display 820 may vary. For example, the size of the display 820 may be 3 inches, 4 inches, 4.65 inches, 5 inches, 6.5 inches, 8.4 inches, 32 inches, and 45 inches. The display 820 may consist of a plurality of pixels. In this case, the resolution may be represented by the number of pixels in the horizontal direction multiplied by the number of pixels in the vertical direction. The display 820 may be implemented as a display panel of various shapes. For example, the display panel may be implemented with various display technologies such as liquid crystal display (LCD), organic light emitting diode (OLED), active-matrix organic light-emitting diode (AM-OLED), liquid crystal on silicon (LcoS), or digital light processing (DLP). The display 820 may be implemented as a touch screen in a form of layer. The touch screen may have not only a display function, but also a function to detect a touch input position, a touched area, and also a touch input pressure. Further, the touch screen may have a function to detect a proximity touch as well as a real touch.

The communicator 830 is an element to perform communication with various types of external devices according to various types of communication methods. The communicator 830 may include at least one selected from a Wi-Fi chip, a Bluetooth chip, a wireless communication chip, and a Near Field Communication (NFC) chip. The processor 840 may perform communication with an external server or various types of external devices by using the communicator 830. When the WI-FI chip or the Bluetooth chip is used, various connection information such as a subsystem identification (SSID) and a session key may be exchanged first, and after the communication is connected by using the connection information, various information may be exchanged. The wireless communication chip may refer to a chip that performs communication according to various communication standards such as institute of electrical and electronics engineers (IEEE), Zigbee, 3rd generation (3G), 3rd generation partnership project (3GPP), and long term evolution (LTE). The NFC chip may mean a chip that operates in a NFC method which uses a 13.56 MHz band from among various radio-frequency identification (RF-ID) frequency bands such as 135 kHz, 13.56 MHz, 433 MHz, 860-960 MHz, 2.45 GHz, or the like.

The memory 850 may store various data for an overall operation of the electronic device 100 such as a program for processing or controlling the processor 840. The memory 850 may store a plurality of application programs driven in the electronic device 100, data and commands for operating the electronic devices 100. At least some of the application programs may be downloaded from an external server through a wireless communication. In addition, at least some of the application programs may exist on the electronic device 100 from when it is released, for a basic function of the electronic device 100. The application program may be configured to be stored in the memory 850, and to perform the operation (or a function) of the electronic device 100 by the processor 840. The memory 850 may store various programs and data used for performing the operation of the electronic device 100. The memory 850 may be implemented as a non-volatile memory, a volatile memory, a flash memory, a hard disk drive (HDD), a solid state drive (SDD) and the like. The memory 850 may be accessed by the processor 840, and may perform readout, recording, correction, deletion, update, and the like, on data by the processor 840. According to an embodiment, the term "memory" as used herein may include a memory 850, a ROM and a RAM in the processor 840, or a memory card (not illustrated) mounted on the electronic device 100 (e.g., a micro SD card, and a memory stick). Also, the memory 850 may store a program, data, and the like for constituting various types of screens that will be displayed in the display area of the display 820.

The processor 840 may be configured to control an overall operation of the electronic device 100 using various programs stored in the memory 850 of the electronic device 100. For example, the processor 840 may include a central processing unit (CPU), a random access memory (RAM), a read-only memory (ROM), and a system bus. Here, the ROM is a component in which an instruction set for booting a system is stored, and the CPU copies an operating system (OS) stored in the memory of the electronic device 100 to the RAM according to an instruction stored in the ROM, and executes the operating system (OS) to thereby boot the system. When the booting is completed, the CPU copies a variety of applications stored in the memory 850 to the RAM, and executes the applications, thereby making it possible to perform a variety of operations. The processor 840 has been described above as including merely one CPU but may be implemented as a plurality of CPUs (or Digital Signal Processors (DSPs), System on Chips (SoCs), or the like).

Figure 9:
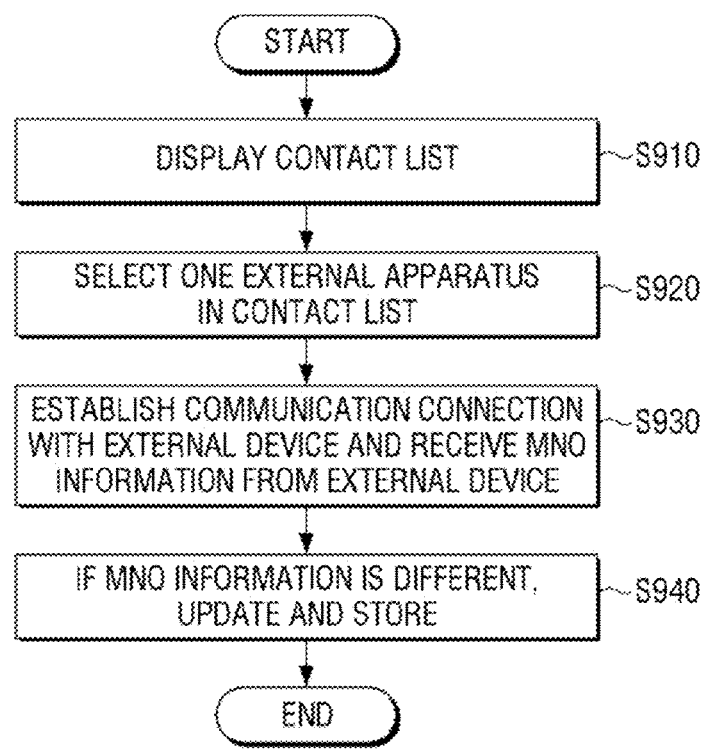
FIG. 9 is a view illustrating a control flow of an electronic device according to an embodiment.

FIG. 9 is a view illustrating a control flow of the electronic device 100 according to an embodiment.

Referring to FIG. 9, the electronic device 100 may display the contact list which includes the MNO information of a plurality of external devices through the display 820 in S910. The electronic device 100 receives a user input for selecting one external device in the contact list in S920. The electronic device 100 may establish a communication connection with the external device selected through the communicator 830 and receives information on the MNO information of the external device from the external device in S930. If the received MNO information of the external device is different from the MNO information of the pre-stored external device, the electronic device 100 updates the MNO information and stores in a memory in S940.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a memory;
a display;
a communicator;
a user inputter; and
a processor operably connected to the memory, the display, the communicator, and the user inputter, and configured to control the electronic device,
wherein the processor is configured to:
control the display to display a contact list including telephone number information of a plurality of external devices and Mobile Network Operator (MNO) information of the plurality of external devices;
in response to a user command for selecting one of the plurality of external devices included in the contact list being input, establish a communication connection with the selected external device;
in response to the communication connection being established, control the communicator to receive information regarding the MNO information of the external device from the selected external device; and
in response to the received MNO information of the external device being different from MNO information of a pre-stored external device, update the contact list based on the MNO information of the external device and store the updated contact list in the memory,
wherein the communicator is configured to:
transmit, to an external server, notification information that MNO information of the electronic device is changed, and
receive, from the external server, notification information that MNO information of at least one external device among the plurality of external devices is changed, and wherein the processor is configured to:
in response to notification information that MNO information of at least one external device among the plurality of external devices is changed being received from the external server, receive changed MNO information of the external device from the external server,
update the contact list based on the changed MNO information, and
store the updated contact list in the memory.

2. The electronic device of claim 1, wherein the display is configured to display call rate information related to the MNO information.

3. The electronic device of claim 2, wherein the processor is configured to:
in response to a user command for selecting one of a plurality of external devices included in the contact list being input through the user inputter, automatically select telephone number information including an MNO that charges a low call rate from among a plurality of telephone number information of the selected external device, and
establish a communication connection with the selected external device by using the automatically selected telephone number information.

4. The electronic device of claim 2, wherein:
the communicator is configured to receive information that a special promotion regarding call rates is offered by a MNO related to telephone number information of the contact list, and
the processor is configured to display the special promotion information on a display.

5. The electronic device of claim 1, wherein the processor is configured to control to display the contact list when a predetermined user input is being received through the user inputter.

6. A method for controlling an electronic device comprising:
displaying a contact list including telephone number information of a plurality of external devices and Mobile Network Operator (MNO) information of the plurality of external devices;
in response to a user command for selecting one of the plurality of external devices included in the contact list being input, establishing a communication connection with the selected external device;
in response to the communication connection being established, receiving information regarding the MNO information of the external device from the selected external device; and
in response to the received MNO information of the external device being different from MNO information of a pre-stored external device, updating the contact list based on the MNO information of the external device and storing the updated contact list in a memory,
wherein the receiving comprises receiving, from an external server, notification information that MNO information of at least one external device among the plurality of external devices is changed, and
wherein the updating comprises:
in response to notification information that MNO information of at least one external device among the plurality of external devices is changed being received from the external server, receiving changed MNO information of the external device from the external server,
updating the contact list based on the changed MNO information, and
storing the updated contact list in the memory.

7. The method of claim 6, wherein the displaying comprises displaying call rate information related to the MNO information.

8. The method of claim 7, wherein the establishing a communication connection comprises:
in response to a user command for selecting one of a plurality of external devices included in the contact list being input, automatically selecting telephone number information including an MNO that charges a low call rate from among a plurality of telephone number information of the selected external device, and
establishing a communication connection with the selected external device by using the automatically selected telephone number information.

9. The method of claim 7, wherein the displaying comprises:
receiving information that a special promotion regarding call rates is offered by a MNO related to telephone number information of the contact list is operated, and
displaying the special promotion information on a display.

10. The method of claim 6, wherein the displaying comprises displaying the contact list when a predetermined user input is received.

11. The electronic device of claim 1, wherein the processor is configured to:
in response to a user command for selecting one of a plurality of external devices included in the contact list being input through the user inputter, automatically select telephone number information including an MNO that charges a low call rate from among a plurality of telephone number information of the selected external device, and
establish a communication connection with the selected external device by using the automatically selected telephone number information.

12. The electronic device of claim 1, wherein:
the communicator is configured to receive information that a special promotion regarding call rates is offered by a MNO related to telephone number information of the contact list, and
the processor is configured to display the special promotion information on a display.

13. The method of claim 6, wherein the establishing a communication connection comprises:
in response to a user command for selecting one of a plurality of external devices included in the contact list being input, automatically selecting telephone number information including an MNO that charges a low call rate from among a plurality of telephone number information of the selected external device, and
establishing a communication connection with the selected external device by using the automatically selected telephone number information.

14. The method of claim 6, wherein the displaying comprises:
receiving information that a special promotion regarding call rates is offered by a MNO related to telephone number information of the contact list is operated, and
displaying the special promotion information on a display.

15. A system, comprising:
an electronic device, the electronic device comprising:
a memory;
a display;
a communicator;
a user inputter; and a processor operably connected to the memory, the display, the communicator, and the user inputter, and configured to control the electronic device, wherein the processor is configured to:

control the display to display a contact list that includes telephone number information of a plurality of external devices and Mobile Network Operator (MNO) information of the plurality of external devices;

in response to a user command for selecting one of the plurality of external devices included in the contact list being input, establish a communication connection with the selected external device;

in response to the communication connection being established, control the communicator to receive information regarding the MNO information of the external device from the selected external device; and in response to the received MNO information of the external device being different from MNO information of a pre-stored external device, update the contact list based on the MNO information of the external device and store the updated contact list in the memory, wherein the communicator is configured to:

transmit, to an external server, notification information that MNO information of the electronic device is changed, and receive, from the external server, notification information that MNO information of at least one external device among the plurality of external devices is changed, and wherein the processor is configured to:

in response to notification information that MNO information of at least one external device among the plurality of external devices is changed being received from the external server, receive changed MNO information of the external device from the external server, update the contact list based on the changed MNO information, and store the updated contact list in the memory.

16. The system of claim 15, wherein the display is configured to display call rate information related to the MNO information.

17. The system of claim 15, wherein:

the communicator is configured to receive information that a special promotion regarding call rates is offered by a MNO related to telephone number information of the contact list, and the processor is configured to:

in response to a user command for selecting one of a plurality of external devices included in the contact list being input through the user inputter, automatically select telephone number information including an MNO that charges a low call rate from among a plurality of telephone number information of the selected external device, establish a communication connection with the selected external device by using the automatically selected telephone number information, and display the special promotion information on a display.

* * * * *